(12) United States Patent
Muller et al.

(10) Patent No.: US 8,881,235 B2
(45) Date of Patent: Nov. 4, 2014

(54) SERVICE-BASED AUTHENTICATION TO A NETWORK

(75) Inventors: Frank Muller, Delft (NL); Franklin Selgert, Berkel en Rodenrijs (NL)

(73) Assignees: Koninklijke KPN N.V., The Hague (NL); Nederlandse Organisatie voor Toegepast-Natuurwetenschappelijk Onderzoek TNO, Delft (NL)

( * ) Notice: Subject to any disclaimer, the term of this patent is extended or adjusted under 35 U.S.C. 154(b) by 206 days.

(21) Appl. No.: 13/139,433

(22) PCT Filed: Dec. 15, 2009

(86) PCT No.: PCT/EP2009/067201
§ 371 (c)(1),
(2), (4) Date: Aug. 15, 2011

(87) PCT Pub. No.: WO2010/069962
PCT Pub. Date: Jun. 24, 2010

(65) Prior Publication Data
US 2011/0296494 A1    Dec. 1, 2011

(30) Foreign Application Priority Data
Dec. 15, 2008  (EP) .................................... 08021705

(51) Int. Cl.
*H04L 29/06* (2006.01)
*H04W 12/06* (2009.01)
*H04W 88/06* (2009.01)

(52) U.S. Cl.
CPC .......... *H04W 12/06* (2013.01); *H04L 63/1466* (2013.01); *H04W 88/06* (2013.01); *H04L 63/0853* (2013.01)

USPC ............................................. 726/3

(58) Field of Classification Search
USPC ............................................. 726/3
See application file for complete search history.

(56) References Cited

U.S. PATENT DOCUMENTS

| | | | |
|---|---|---|---|
| 2005/0086495 A1* | 4/2005 | Sheth et al. ................ | 713/182 |
| 2005/0228992 A1 | 10/2005 | Mizikovsky | |
| 2006/0148483 A1* | 7/2006 | Howard et al. .............. | 455/450 |
| 2006/0288407 A1 | 12/2006 | Naslund et al. | |
| 2009/0103728 A1* | 4/2009 | Patel ........................... | 380/247 |

OTHER PUBLICATIONS

"3rd Generation Partnership Project; Technical Specification Group SA WG3; A Guide to 3rd Generation Security" (3G TR 33.900 version 1.2.0), (Jan. 2000), pp. 1-26.
Part 15.1: Wireless Medium Access Control (MAC) and Physical Layer (PHY) Specifications for Wireless Personal Area Networks (WPANs), IEEE STD 802.15.1 (2002) 1169 pages.

(Continued)

*Primary Examiner* — Kambiz Zand
*Assistant Examiner* — Ali Shayanfar
(74) *Attorney, Agent, or Firm* — McDonnell Boehnen Hulbert & Berghoff LLP

(57) ABSTRACT

A method and a system for service-based authentication of a terminal to a network is described, wherein the terminal comprises a number of communications interfaces, each communications interface allowing the terminal to set-up a predetermined communication channel with the network. The method comprises the steps of: sending a service request for access to a network service; receiving in response to the service request an authentication request from the network; identifying the communication channel through which the authentication request was received; and, sending an authentication response RES to the network, wherein the authentication response depends on the identified communication channel.

13 Claims, 5 Drawing Sheets

(56) References Cited

OTHER PUBLICATIONS

"Digital Enhanced Cordless Telecommunications (DECT); Common Interface (CI); Part 1:Overview", ETSI EN 300 175-1, V1.9.1, (Sep. 2005) pp. 1-28.

3rd Generation Partnership Project; Technical Specification Group Services and System Aspects; 3G security; Access security for IP-based services (Release 8), 3GPP TS 33.203 V8.7.0 (Sep. 2009), pp. 1-114.

"Digital cellular telecommunications system (Phase 2+); Security aspects," (GSM 02.09 version 7.1.1 Release 1998), pp. 1-11.

"Digital cellular telecommunications system (Phase 2+); Security related network functions," (GSM 03.20 version 7.2.0 Release 1998), pp. 1-104.

"3rd Generation Partnership Project; Technical Specification Group Services and System Aspects; 3G Security; Security architecture," (Release 9), 3GPP TS 33.102 V9.0.0 (Sep. 2009), pp. 1-70.

"3rd Generation Partnership Project; Technical Specification Group Services and System Aspects; Generic Authentication Architecture (GAA); Generic bootstrapping architecture," (Release 8), 3GPP TS 33.220 V8.7.0 (Jun. 2009), pp. 1-75.

"3rd Generation Partnership Project; Technical Specification Group Services and System Aspects; Generic Authentication Architecture (GAA); Access to network application functions using Hypertext Transfer Protocol over Transport Layer Security (HTTPS)," (Release 8), 3GPP TS 33.222 V8.0.0 (Jun. 2008), pp. 1-23.

"3rd Generation Partnership Project; Technical Specification Group Services and System Aspects; Generic Authentication Architecture (GAA); Generic Bootstrapping Architecture (GBA) Push function," (Release 8), 3GPP TS 33.223 V8.5.0 (Sep. 2009), pp. 1-23.

"3rd Generation Partnership Project; Technical Specification Group GSM/EDGE Radio Access Network; Generic Access Network (GAN); Stage 2," (Release 8), 3GPP TS 43.318 V8.4.0 (Feb. 2009-02), pp. 1-127.

International Search Report and Written Opinion, International Application No. PCT/EP2009/067201 dated Feb. 26, 2010.

Ericsson, "How to Mitigate the Interleaving Attack and Reduce the Trust in the Authenticator", 3GPP TSG SA WG3 Security, Feb. 2003, pp. 1-3.

European Seach Report, European Patent Application No. 08021705.2 dated Jun. 5, 2009.

\* cited by examiner though not necessarily, the authentication information, on the basis of the identified communications channel.

SERVICE-BASED AUTHENTICATION TO A NETWORK

CROSS REFERENCE TO RELATED APPLICATIONS

The present application is a national stage entry of PCT/EP2009/067201, filed Dec. 15, 2009, and claims priority to EP 08021705.2, filed Dec. 15, 2008, the entire contents of which is incorporated herein by reference.

FIELD OF THE INVENTION

The invention relates to a service-based authentication to a network and, in particular, though not exclusively, to a method and a system for a service-based authentication of a terminal to a network and a service interface module for use in such system.

BACKGROUND OF THE INVENTION

The new generation mobile devices, such as smart phones, provide more and more enhanced computational functionalities via open network connections. Such mobile devices are e.g. capable of receiving e-mail, share software with one another through short-range connections, downloading and executing software from the Internet, making automated calls and act under remote control. Hence, similar to a personal computer, mobile devices and in particular the software components involved in the setting up of a connection between the mobile device to the network, are vulnerable to attacks of malicious code (malware). Typically malware attempts to make misuse of mobile device or to simply disrupt legitimate use of a mobile device.

Typically, malware makes use of security flaws in the authentication procedure which provides a subscriber access to a network. For example the GSM authentication and key agreement (AKA) only authenticates the mobile device to the network, but not the other way around. The GSM AKA is therefore vulnerable to so-called false base station attacks wherein an attacker pretends to be a valid base station. In the UMTS AKA part of these threats are mitigated by using a mutual authentication wherein the mobile device has to authenticate itself to the Visitor Location Register (VLR) and the VLR has to authenticate itself to the mobile device. An overview of the security threats in the GSM AKA and the way a number of these threats are counteracted by the UMTS AKA are described in ETSI TS 33.900.

From TS 33.900 it follows that the UMTS AKA is still vulnerable to security attacks. For example, the UMTS AKA is vulnerable to the so-called man-in-the-middle attacks, wherein a mobile device of an attacker may use authentication information from the (U)SIM of the victim in order to obtain access to the network. Such a man-in-the-middle attack allows network access as if the connection was set up by the victim. As the network cannot distinguish between a legal situation and such attack the malware allows to set up calls on the expenses of the victim thereby causing substantial damage.

SUMMARY OF THE INVENTION

It is an object of the invention to reduce or eliminate at least one of the drawbacks known in the prior art and to provide in a first aspect of the invention a method for service-based authentication of a terminal to a network. The terminal comprises one or more communications interfaces for allowing the terminal to setting-up a communication channel with the network. The method comprises the steps of: sending a service request for access to a network service; receiving in response to the service request an authentication request from the network; identifying the communication channel through which the authentication request was received; and, sending an authentication response RES to the network, wherein the authentication response depends on the identified communication channel.

The method allows the network to determine through which communication channel authentication information is transmitted to the network. Determination of the communication channel can be easily achieved by identifying the communication interface through which the authentication request is received. Such service-based authentication method effectively prevents misuse of authentication information, e.g. a man-in-the-middle attack wherein an attacker uses authentication information from the (U)SIM of the victim in order to obtain access to the network.

Furthermore, the method is compatible with all or at least most existing and proposed AKA's. It only requires determination of the communication channel through which the request was received and secure insertion of information regarding the communication channel into the response.

In one embodiment the method further comprises the steps of: determining a service code associated with the identified communication channel; calculating the response RES on the basis of the information in the authentication request and the service code, thereby securely including, preferably cryptographically, information regarding the identity of the communication channel through which the authentication request was received into the response.

The information regarding the communication channel through which the authentication information is transmitted to the network is securely inserted in the response of the identity module of the terminal. Hence, it is not possible or at least very difficult for malware to detect and/or modify the service channel information.

In another embodiment the terminal used in the method comprises an identity module and a service interface (SI) module, the SI preferably implemented as a trusted hardware module, configured to securely communicate with the identity module and to identify the communications channel through which the authentication request was received.

By using a service interface module as a trusted hardware module in the terminal, a very safe and reliable method is achieved for sending the information regarding the identity of the communication channel to the network. Preferably, the service interface module is configured to receive all incoming authentication signals from the network. Hence, all authentication request will be routed via the service interface module to the identity module of the terminal.

In yet another embodiment the authentication request comprises authentication information, preferably a random challenge RAND and the method further comprises the steps of: modifying the authentication information on the basis of the identified communications channel; generating, preferably using an authentication and key agreement (AKA) of a telecommunication telecommunications standard, an authentication response RES on the basis of the modified authentication information.

In one embodiment the authentication request comprises authentication information, preferably a random challenge RAND and the method further comprises the steps of: generating, preferably on the basis of an authentication and key agreement (AKA) of a telecommunication telecommunications standard, an authentication response RES; modifying, preferably using a one-way function, the authentication parameter RES on the basis the identified communications channel.

This embodiment allows simple and safe implementation of the method by using a service interface module which securely communicates with the identity module. Identification of the communication channel and secure insertion of the information regarding the identified communication channel may take place in the service interface module so that no modifications of the identity module are required. This implementation is thus compatible with existing identity modules.

In another embodiment the method further comprises the steps of: the terminal sending a service request via a predetermined communications channel to the network; the network generating an expected service code XSC on the basis of the type of communications channel the service request was sent to the network; determining on the basis of expected service code XSC an expected response XRES.

In one embodiment the method further comprises the steps of: comparing the expected response XRES with the authentication response RES send by the terminal to the network; and, determining the terminal to be in an un-trusted state if RES is not equal to XRES.

Hence, the method only requires a simple modification in the existing network in the sense that it requires a network node which is configured to identify the communication channel through which the service request is received by the network and to extract the information regarding the communication channel encrypted in the terminal response.

In one embodiment the terminal comprises a 2G or 3G type radio interface, a Bluetooth radio interface, a WLAN interface, a digital enhanced cordless (DECT) radio interface or an Ethernet data interface.

In a further aspect the invention relates to a service interface module for use in a terminal, preferably configured to securely process all authentication information transmitted to and from an identity module in the terminal, wherein the service interface module comprises: a receiver for receiving an authentication signal from the network via one of the communications interfaces of the terminal; a channel identifier for identifying the communication channel through which the authentication signal was received, preferably by providing a service code associated with the identified communication channel; an interface for establishing a secure communication channel between the module and an identity module of the terminal.

All functionality required in the terminal for implementation of the method can be simply located in one trusted hardware module which securely communicates with the identity module.

In one embodiment the service interface module further comprises a modifier for modifying an authentication response of the identity module on the basis of the identified communication channel, or sender for transmitting information regarding the identified communications channel to the identity module, or modifier for modifying the authentication request received from the network.

In another aspect the invention relates to an identity module, preferably a smartcard, for establishing a safe communication channel with a service interface module as described above. The safe communication channel may for example consist of a link protected with cryptography or a direct hardware link between the service interface module and the identity module that cannot be interfered with by an attacker. The identity module comprises: a calculator for calculating a response RES—preferably according to a GSM AKA, a 3GPP AKA or an IMS AKA—upon receipt of an authentication request; and, optionally, a modifier for modifying the response RES on the basis of a predetermined mathematical function using information on the identified communication channel.

In yet another aspect the invention relates to a terminal, preferably a mobile device, for accessing network services, wherein the terminal is configured to send in response to an authentication request a modified response RES' to the network wherein the modification depends on the type of communication channel the authentication request was received by the terminal.

In one embodiment the terminal comprises a service interface module according as described and, optionally, an identity module as described above.

In a further aspect the invention relates to a network node for service-based authentication of a terminal to a network, wherein the network node is configured to generate in response to the receipt of an authentication data request a modified expected response XRES', wherein the modification of the expected response XRES depends on the type of communication channel the authentication data response was sent to the network.

In one embodiment the network node comprises: a receiver for receiving a service request from a terminal; a generator for generating an expected service code XSC on the basis of the type of communication channel the service request was sent to the network; a generator for generating an expected response XRES or a receiver for receiving from another network node an expected response XRES, preferably according to a GSM AKA, a 3GPP AKA or an IMS AKA; and, a modifier the expected response XRES on the basis of a predetermined mathematical function, preferably a one-way function, using the expected service code XSC as an input parameter.

In one embodiment the network node further comprises: a receiver for receiving a response RES from a terminal; a comparator for comparing the response RES with the modified expected response XRES'.

In yet a further aspect the invention relates to a system for service based authentication to a network, comprising: a terminal configured to send in response to an authentication request a modified response RES' to the network wherein the modification depends on the type of communication channel the authentication request was received by the terminal; and, a network node configured to generate in response to the receipt of an authentication data request a modified expected response XRES' and configured to compare RES' with XRES', wherein the modification of the expected response XRES depends on the type of communication channel the authentication data response was sent to the network.

The invention also relates to a computer program product comprising software code portions configured for, when run in the memory of a terminal, preferable a mobile device, executing the method steps as described above.

The invention will be further illustrated with reference to the attached drawings, which schematically will show embodiments according to the invention. It will be understood that the invention is not in any way restricted to these specific embodiments.

DETAILED DESCRIPTION

Figure 1:
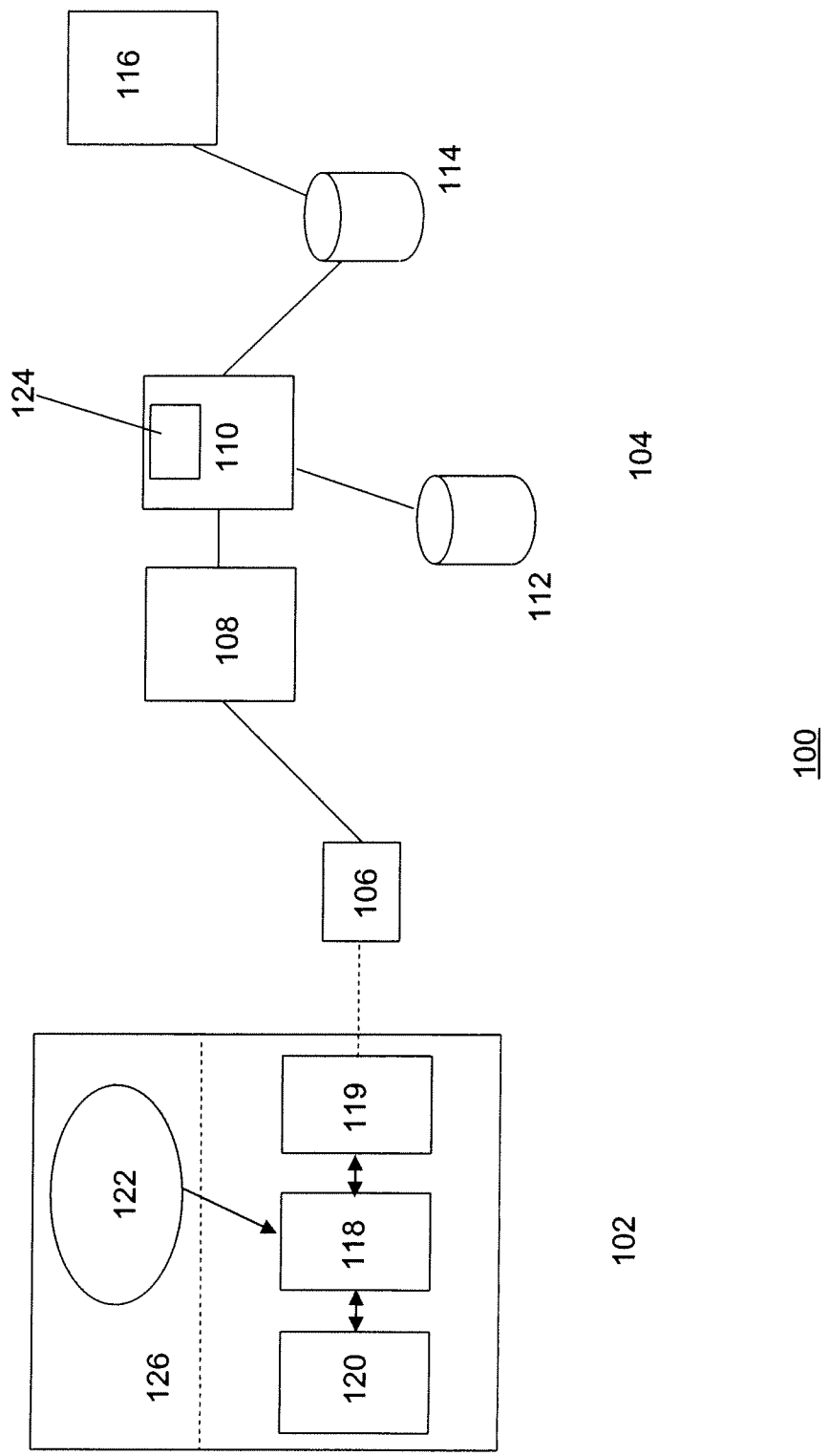
FIG. 1 depicts a schematic representation of a system according to one embodiment of the invention.

FIG. 1 illustrates a schematic representation of a communications system 100 according to one embodiment of the invention. The system comprises a terminal 102 connected to a communications network 104. In one embodiment the network may be a 2G-type (e.g. GSM) mobile network comprising a base transceiver station (BTS) 106 serving as an access node. The BSC is connected via a base station controller (BSC) 108 to a mobile switching center (MSC) 110 of e.g. a visiting network (VN). The MSC is linked to a visited location register (VLR) 112, which is a database that stores user related data and performs security functions. The MSC is further linked to a home location register (HLR) 114 which is located in the home network (HN) where the user of the terminal 102 has a subscription with the network operator. The HLR 114 stores user related data, e.g. subscription related data, and co-operates with the MSC/VLR 110 to keep track of the location of the terminal. The HLR is connected to an authentication centre (AuC) 116. The authentication centre (AuC) comprises (amongst others) algorithms for the calculation of authentication parameters used in the authentication procedure. For each subscriber the AuC stores a secret authentication key K which is also stored in an associated identity module, e.g. a (U)SIM card or the like, located in the terminal.

Alternatively, the network in FIG. 1 may also depict a 3G-type (e.g. UMTS) mobile network comprising 3G network elements. In that case, the network may comprise a radio base station (Node-B) 106 connected via a Radio Network Controller (RNC) 108 to a Serving GPRS Support Node (SGSN) 110. The SGSN is further connected to a VLR 112 and an AuC/HLR 114,116 in a similar way as in the 2G-type network as described above.

In a further embodiment the communications network 104 may comprise IMS-based network elements in the form of a set of Call/Session Control Functions (CSCF) such as a Proxy-CSCF (P-CSCF), an Interrogating-CSCF (I-CSCF), a Serving-CSCF (S-CSCF) and a Home Subscriber Server (HSS). In yet further embodiments the communications network may comprise 3GPP LTE or 3GPP SAE network elements.

The terminal 102 may be a personal computer or a mobile device such as a smart phone, a personal digital assistant (PDA), a laptop or any other mobile communications device capable of providing services over one or more networks. The terminal comprises a service interface (SI) module 118, an operating system (OS) 126 and an identity module 120.

The SI module 118 acts as a central access point to wired and wireless network services and comprises for that purpose a number of service interfaces. For example, for wireless services, it includes an interface to an RF module, e.g. a 2G or 3G radio card, comprising an RF receiver connecting to one or more antennas. FIG. 1 depicts an exemplary implementation wherein a radio card module 119 provides radio contact with the base station 106. The RF interface of the radio card is capable of receiving and/or transmitting RF signals in accordance with various wireless technologies using licensed frequency bands (e.g. TDMA for GSM services or W-CDMA for UMTS services). The radio card must have a secure interface to the SI module. Beside the interface to the RF module the SI module may comprise a number of interfaces to other wireless interface modules, e.g. wireless interface modules using non-licensed frequency bands such as the IEEE 802.11 interface for WLAN services, the IEEE 802.15.1 interface for Bluetooth services, an DECT interface as described in ETS 300 175, etc.

The SI module may also comprise interfaces to one or more wired interface modules, e.g. an Ethernet interface allowing the SI module to be connected to the network using a wired Ethernet communication channel. An access and configuration (AC) manager in the SI module manages the set-up of a communication channel to an access node of a network or—in case of a short-range connection such as Bluetooth—to another terminal. It determines the correct parameter for operation under a specific wired or wireless technology and/or protocol associated with the networks services requested by the terminal. Further, the SI module is configured to securely include information regarding the used interface in the data sent to a Service Identification Unit (SIU) 124 in the network. The interaction between the SI module 118 and the SIU 124 is explained hereunder in more detail.

The Operating System (OS) of the terminal comprises a kernel which manages the resources of the mobile device e.g. the Central Processing Unit (CPU), memory for storing program instructions and data and Input/Output (I/O) devices such as the radio module. Further, the OS comprises Application Programming Interfaces (APIs) through which application programs 122 may access services offered by the OS. The OS may comprise APIs for setting up wired or wireless connections via one of the interfaces modules.

The identity module 120, which is typically removable, may be a UICC (Universal Integrated Circuit Card) for use in mobile devices suitable for 2G-type network services (GSM) or 3G-type network services, (UMTS). To that end, the UICC may comprise a Subscriber Identity Module (SIM) application comprising SIM functions and/or a UMTS Subscriber Identity Module (USIM) application comprising USIM functions. It is to be understood that the identity module is not limited to SIM and/or USIM applications. In further embodiments, the identity module may be an IP Multimedia Subsystem SIM (ISIM) for authenticating and accessing IMS-based services according to a predetermined IMS-based AKA as e.g. described in ETSI technical specification TS 33.203 or an extensible authentication protocol (EAP) based SIM for authentication and accessing a network according to a predetermined EAP-based AKA as described for instance in RFC4187.

The identity module may comprise a processor, one or more memory components e.g. ROM, RAM and/or EEPROM and I/O circuitry. For authentication purposes the UICC comprises a secret service-subscriber authentication key K and one or more algorithms for calculating a response comprising one or more authentication parameters upon the reception of a random challenge.

FIG. 2(a) illustrates a schematic flow diagram of the standard GSM authentication procedure which may be used by the SIM module in the identity module. In the GSM standard the MSC initiates, in response to a service request of a network service originating from the terminal, a request for authentication data to the AuC/HLR (step 202). A random number generator at the AuC/HLR generates a random value RAND that is input to the GSM A3/A8 algorithms which generate an expected response XRES and a cipher key $K_C$. The triplet {RAND, XRES, $K_C$} is returned to the MSC (step 204) that subsequently forwards the RAND value to the SIM card of the terminal (step 206). Corresponding calculations are performed by the terminal, typically by the integrity module, which returns a calculated response RES back to the MSC (step 208). By comparison of the RES with the XRES the MSC can authenticate the terminal to the network.

In the standard UMTS authentication procedure similar steps as the GSM procedure are performed. However, in order to improve the security additional parameters and a set of eight functions f0-f5, f1*, f2* are used. FIG. 2(b) illustrates a schematic flow diagram of the UMTS authentication procedure, which may be used with a USIM application in the identity module. In response to a request for authentication data from the SGSN/VLR (step 210), the AuC/HRL generates a random number RAND (using function f0) and a fresh sequence number SQN. The AuC/HRL provides the secret authentication key K (which is both stored in the AuC and the USIM but never directly exchanged) and an operator specific Authentication Management Field AMF. These four parameters are fed into the five symmetric encryption functions f1-f5, resulting in five new parameters: the Message Authentication Code (MAC), the Expected Response (XRES), the Ciphering Key (CK), the Integrity Key (IK) and the Anonymity Key (AK). The sequence number SQN is separately encrypted into $SQN^1$.

The AuC/HLR returns these parameters in an authentication vector (AV) {AUTN,RAND,XRES,CK,IK} to the SGSN/VLR (step 212) wherein the Authentication token AUTN is a triplet {$SQN^1$,AMF,MAC}. Thereafter, the SGSN/VLR forwards an Authentication and Ciphering request comprising RAND and AUTN to the mobile device (step 214). Using RAND and AUTN the USIM calculates—amongst others—a response RES, which is sent back to the SGSN (step 216) and compared with the XRES as received from the AuC/HLR.

The keys for ciphering and integrity checking have a limited lifetime to prevent attempts to break the cipher or integrity protection by brute force long duration monitoring attacks. Upon expiry, a new set of ciphering and integrity keys are generated with a re-authentication between the terminal and the network. This re-authentication process is regularly repeated.

The GSM AKA is described in detail in ETSI standards GSM 02.09 and GSM 03.20 and the UMTS AKA described in detail in ETSI technical specification TS 33.102, which are hereby incorporated by reference.

Figure 3:
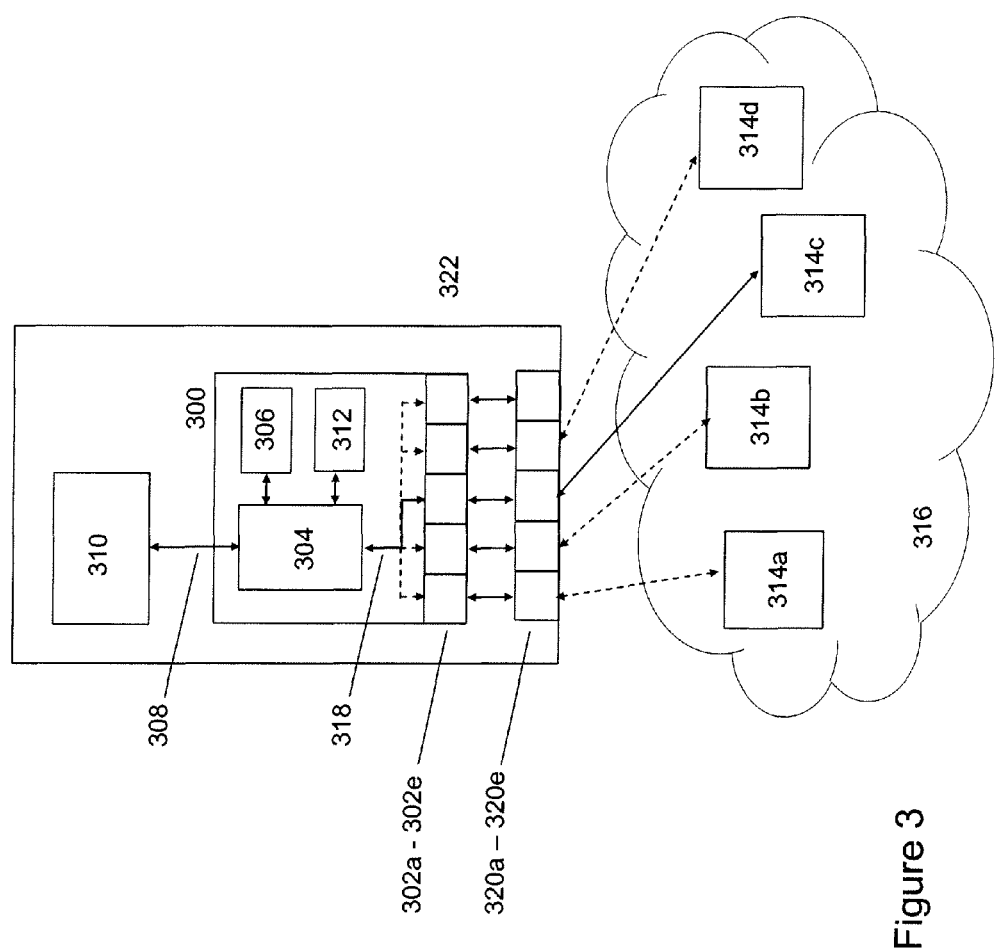
FIG. 3 depicts the service interface module according to one embodiment of the invention.

FIG. 3 depicts an SI module according to a preferred embodiment of the invention The SI module 300 is located in a terminal 322 and comprises a number of interfaces 302a-302e, which are connected, preferably through one or more secure communication channels, to associated interface modules 320a-320e. The interface modules are located in the terminal and used for setting up a network connection with the network 316. The SI module is configured to generate a service code (SC) identifying the specific service interface used to set up a wired or a wireless communication channel. To that end, the AC manager 304 in the SI module may use a look-up table 306 comprising the different types of service interfaces supported by the mobile terminal and the associated service codes. The AC manager may be implemented in the form of a processor and one or more memory modules comprising e.g. the configuration data of the look-up table.

The hardware of the terminal is preferably configured in such a way that all incoming authentication requests for a network service received by one of the interfaces 302a-302e will be centrally routed via the SI module to the UICC connected to the SI module. Such hardware architecture ensures that all incoming authentication requests are identified with respect to the communication channel the request was received by the terminal. Further, the SI module is configured to provide a secure communication channel 308 with the UICC 310 connected to the SI module. Hence, preferably, the SI module is implemented in the form of one or more trusted hardware components.

If, for example, the terminal 322 receives a network signal, e.g. a 3G signal, via a 3G RF interface module 320c and the 3G interface 302c of the SI module, the signal is translated into a digital signal in accordance with the technical specifications of the wireless air interface. Thereafter the digital signal comprising the authentication request is transmitted via the SI module to the UICC 310. Further, the AC manager 304 identifies the service code associated with the 3G RF interface 302c using a look-up table 306. The service code is used by the SI module to provide the network with information regarding the origin of the authentication request.

Figure 2:
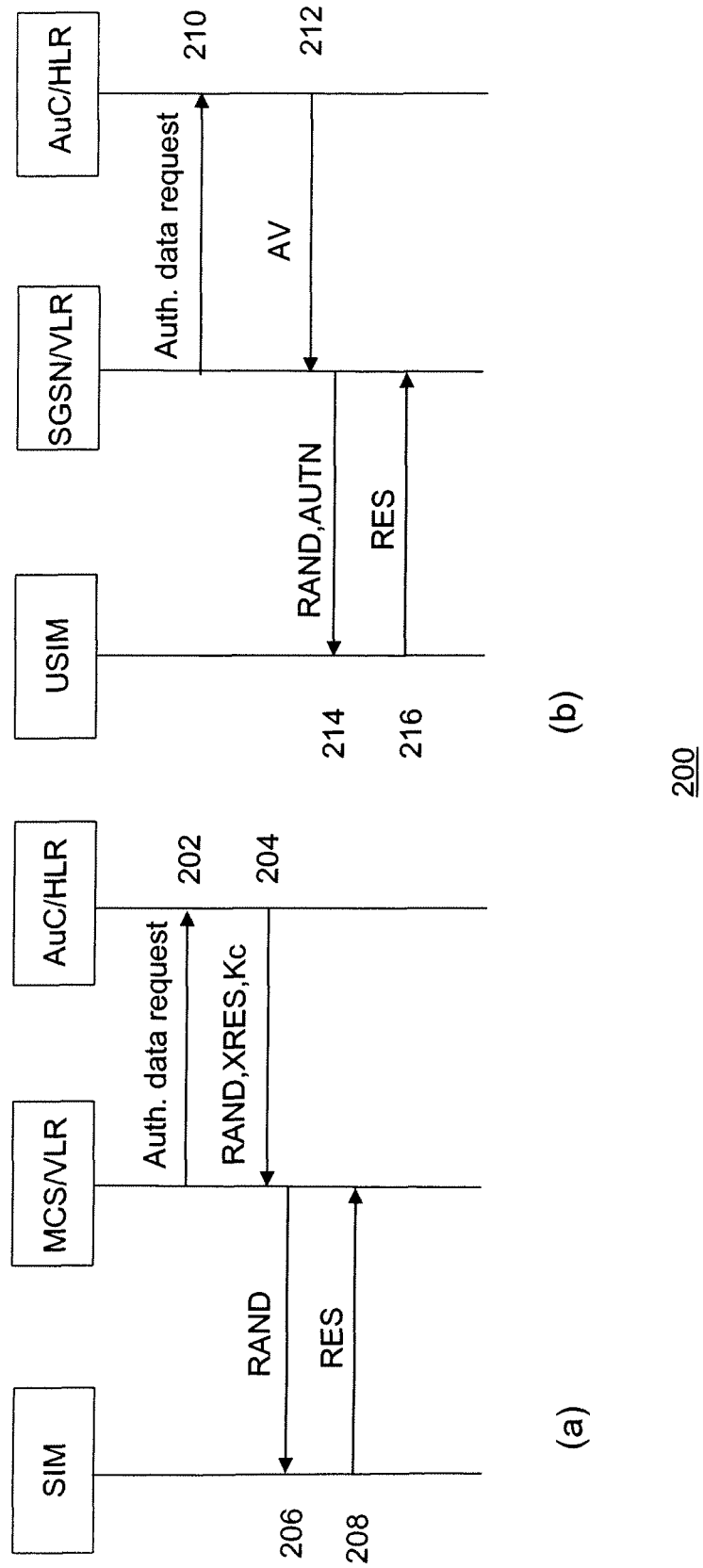
FIG. 2 illustrates a schematic flow diagram of the GSM authentication procedure and the UMTS authentication procedure.

The UICC processes the authentication request according to an AKA of a telecommunications standard, e.g. a GSM AKA or a UMTS AKA as described in relation with FIG. 2 and then returns a response RES back to the SI module. Thereafter, the SI module uses a predetermined mathematical algorithm f stored in a secure memory 312 of the SI module in order to securely include the information embodied in the service code into the response RES received from the UICC. Preferably, the mathematical algorithm f is a so-called one-way function which is easy to compute but impossible or very hard to invert. A suitable one-way function may be a secure hash operation with the SC. Inserting the service code into the response allows the SI module to inform the network 316 about the communication channel (Bluetooth 314a, WLAN 314b, 3G 314c, Ethernet 314d, etc.) through which the authentication request was received from the network in a way which is not, or at least very difficult, to modify by malware.

In order for the network to extract the channel information, the network, preferably the SGSN/VLR or an equivalent network node such as the MCS/VLR, comprises an Service Identification Unit (SIU). The SIU comprises a function f which is identical to the function f used by the SI module. Further, the SIU is configured to determine through what type of communication channel a service request is received.

The advantage of the architecture of the SI module as depicted in FIG. 3 is that the specifications of the (U)SIM do not require changes. The implementation is simple and only requires the installation of a SI module in the terminal and a SIU in the network. Moreover, the architecture is backwards compatible with conventional equipment, i.e. terminals and network nodes (e.g. SGSN/VLR or MCS/VLR) which do not comprise a SI mode or a SIU.

A more detailed explanation on the functioning of the SIU will be given in relation to FIG. 4.

Figure 4:
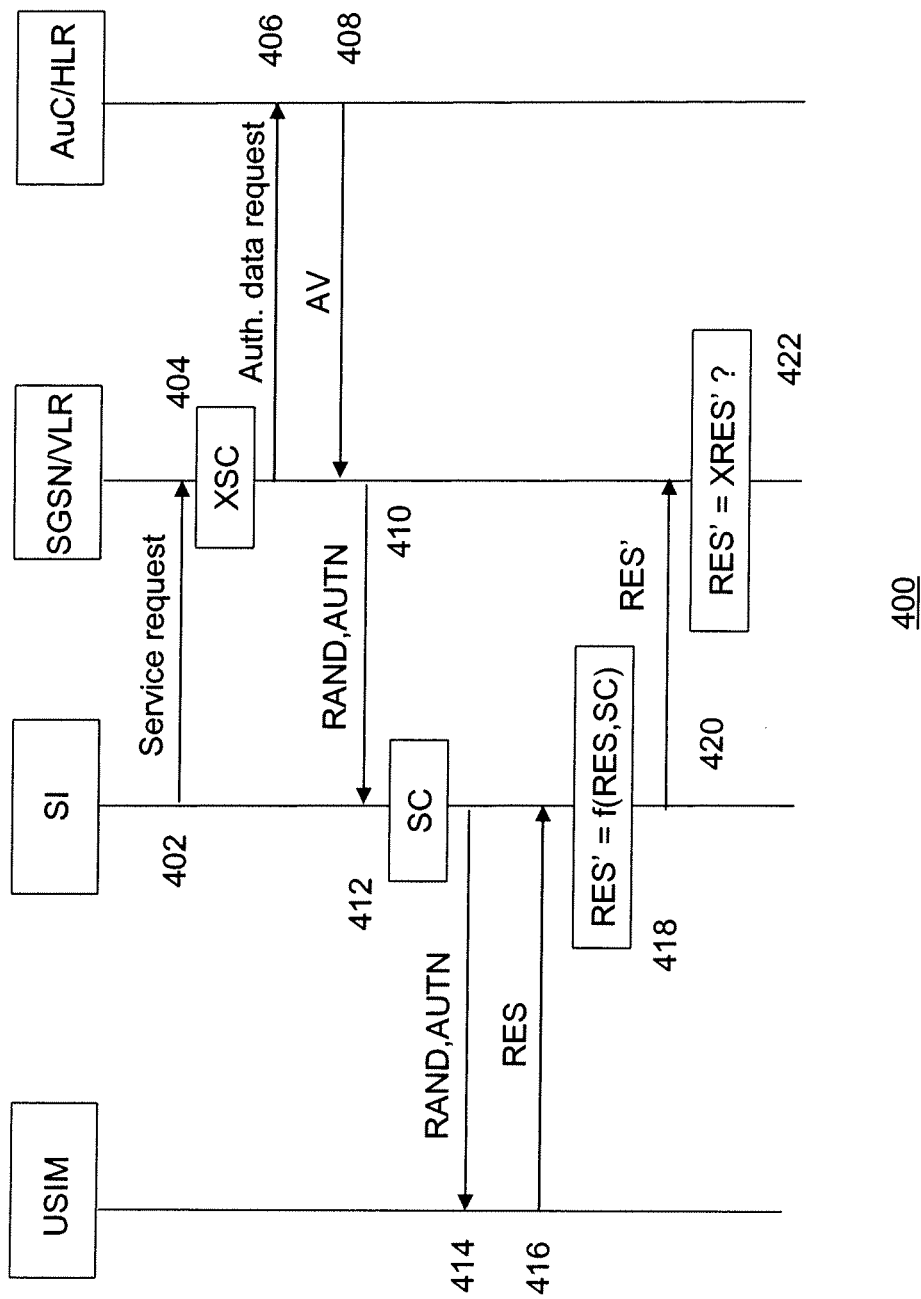
FIG. 4 depicts a flow diagram according to one embodiment of the invention.

FIG. 4 depicts a process flow 400 between a UMTS network and a terminal comprising a USIM and an SI module as described in relation with FIGS. 1 and 3. The process is started by a terminal application requesting a UMTS service from the network. The request triggers the RF interface module to set-up up a wireless UMTS communication channel between the terminal and an access node of the requested UMTS network. Thereafter, a service request is transmitted via the wireless communication channel to the SGSN/VLR (step 402).

Then the SIU in the SGSN/VLR determines through which service interface (UMTS, GSM, WiFi, Bluethooth, etc.) contact was established with the terminal. On the basis of the identified service interface information an expected service code XSC is determined (step 404). The SIU may determine XSC by retrieving the service code associated with the identified service interface (in this case a UMTS service) from a look-up table—substantially identical to the one used by the SI module in the terminal—stored in a secure memory of the SI module.

In response to the service request, the SGSN/VLR sends an authentication data request to the AuC/HLR of the network (step 406). The AuC/HLR generates a UMTS authentication vector AV, which is sent back to the SGSN/VLR (step 408). Subsequently RAND and AUTN are sent in an Authentication and Ciphering request via the wireless communication channel to the terminal (step 410). When the RF interface module of the terminal receives the radio signal comprising the request, the signal is converted to a digital signal. The AC manager identifies the service code associated with the interface used by the SI module to communicate with the RF module (step 412). Thereafter, the digital signal comprising the RAND and AUTN is forwarded to the USIM (step 414), which calculates the response RES using e.g. the f1-f5 algorithms of the UMTS AKA. Then the USIM sends the response RES back to the SI module (step 416).

Using the SC and the one-way function f, the SI determines a modified response RES'=f(RES,SC) (step 418), hence securely inserting information about the communication channel through which the request was received. This way, the response RES' becomes specific for the service it is meant for. The response RES' is subsequently transmitted back via RF interface to the SGSN/VLR in the network (step 420) for comparison with an expected response XRES' (step 422). The expected response XRES' may be determined by the SIU using the one-way function f with the expected response XRES determined on the basis of the UMTS AKA and the SC as the input parameters: XRES'=f(XRES,SC).

Thereafter a comparison between the terminal response RES' and the expected response XRES' is made. If RES' is equal to XRES' then this provides an indication for the network that the terminal received an authentication request via the communication channel that was expected by the network. In that case access to the network is granted.

If RES' is not equal to XRES' then an indication to the network is provided that the terminal received an authentication request via a communication channel different from the communication channel expected by the network. This may provide the network with an indication that the terminal may be corrupted by malware.

It is noted that the invention is not limited to the embodiment as described in relation with FIGS. 3 and 4. In a further embodiment the UICC (instead of the SI module) comprises the one-way function f for securely inserting the service code information into the response.

After the AC manager has selected the correct SC, the code is inserted into the digital signal comprising the request and send to the identity module for further processing (e.g. authentication and/or computation of the decryption key). Hence, in this variant the digital signal sent by the SI module to the identity module comprises information via which service interface (and hence via which communications channel) the signal was received. Further variants for sending the service code to the identity module may include, e.g. sending the service code to the identity module in a separate signal.

In one embodiment the (U)SIM may modify the authentication information in the authentication request, e.g. a random challenge RAND, on the basis of the service code SC and subsequently calculate a response RES on the basis of an authentication and key agreement (AKA) of a telecommunications standard. For example, in the case of a GSM service the SIM may perform the steps: RAND'=f(RAND,SC) and RES'=A3(RAND',$K_C$). In another variant, the SIM first calculates the response RES on the basis of the RAND and then modifies RES on the basis of SC: RES'=A3(RAND,$K_C$) and RES'=f(RES,SC). In the case of an UMTS service, the f1-f5 algorithms of the UMTS AKA are used instead of the A3 algorithm of the GSM AKA.

Depending on the specific scheme implemented in the USIM, the SIU which comprises the mathematical function f used by the USIM in the terminal, may determine RAND'=f(RAND, XSC) and send this value to the AuC/HLR for determining the expected response XRES' on the basis the UMTS AKA using RAND' as one of the input parameters. Alternatively, the AuC/HRL may first determine XRES on the basis the UMTS AKA using RAND as one of the input parameters and then send this value to the SIU for determining the expected response XRES'=f(XRES,XSC).

Figure 5:
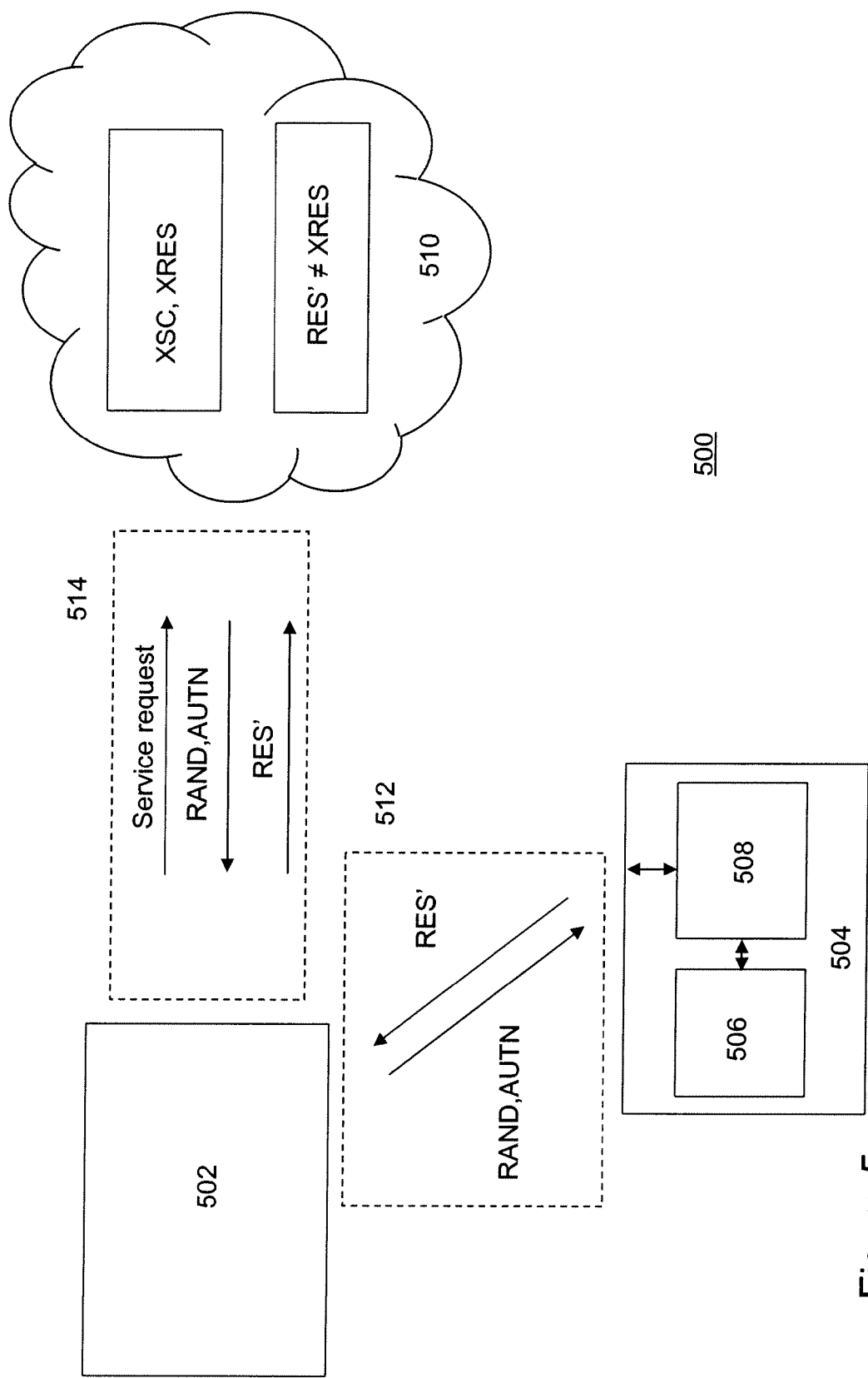
FIG. 5 illustrates prevention of a fraudulent authentication procedure by using the invention.

FIG. 5 represents a simplified schematic illustrating how a fraudulent authentication procedure may be prevented using the invention. In this scheme a first terminal 502 of an attacker remotely connects to an infected second terminal 504 of a victim and subsequently requests and uses authentication information from the (U)SIM 506 of the victim to obtain access to the network 510.

The malware in the second terminal 504 allows the terminal of an attacker 502 to make a first communication channel 512, e.g. a Bluetooth connection, with the infected terminal of the victim. Other types of connections such as a WiFi connection or a wired connection, such as an Ethernet connection, may also be possible. After connecting to the victim, the attacker starts an authentication procedure to the network by sending a service request via a second communication channel 514 to the AuC/HRL. In response, the attacker will receive an authentication request comprising—amongst others—RAND and AUTN. Instead of responding to the request, the attacker forwards the request to the victim using the Bluetooth connection to the (U)SIM of the victim.

A conventional (U)SIM cannot distinguish between requests originating from different communication channels (e.g. UMTS, GSM, WiFi, Bluetooth, etc.). In that case, the (U)SIM responds to the request by calculating a correct response RES, which is subsequently send via the Bluetooth connection (i.e. the communication connection where the request came from) to the network. The attacker may use this RES to authenticate itself successfully to the network. Using this mechanism the attacker is capable of correctly answering each subsequent Authentication and Ciphering Request from the network.

If however the network 510 and the infected terminal 504 in FIG. 5 are configured as a communications system according to the invention as described in relation with FIG. 1, the SI module 508 is able to make a distinction between requests originating from different sources. In that case, the network 510 will determine an expected service code XSC on the basis of the request of the attacker. As the attacker requested a UMTS service via second communication channel 514, the network will set the XSC to the service code corresponding to a UMTS service. Similarly, the SI module 508 of the infected terminal will modify the RES using the service code corresponding to a Bluetooth communications channel 512. This modified RES' is sent via the Bluetooth connection to the network, which will then determine that the XRES' calculated by the network on the basis of XSC does not match RES' because the communication channel used to send a request for a UMTS service to the network is different from the communication channel through which the terminal received the authentication request. In that case, the network may take appropriate action.

In one embodiment, the network may calculate the expected response values (XRES", XRES'", etc.) for each service code available in the look-up table located in a service node of the network. If a XRES' value associated with a particular service code matches RES' then the source of the request received by the terminal may be determined.

This information may be used by the network to take appropriate action. It may e.g. provide no or limited access to the network or place the mobile device in a separate isolation or quarantine network in order to provide remediation services to the mobile device of the subscriber. If the response RES' is neither equal to XRES' nor to the other expected responses then the authentication procedure has failed.

It is to be understood that the invention may also be used with the IMS AKA (3GPP TS 33.203), in Generic Bootstrapping (GBA) applications (see 3GPP TS 33.220, 33.222, 33.223) or with the EAP AKA and/or EAP SIM in WLAN interworking applications. It can also be used in generic access solutions to the mobile network (see 3GPP TS 43.318).

Further, it is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. Method for service-based authentication of a terminal to a network, the terminal comprising one or more communications interfaces for setting-up a communication channel with the network, the method comprising:
the terminal sending a service request for access to a network service;
the terminal receiving in response to the service request an authentication request from the network;
the terminal identifying the communication channel through which the authentication request was received;
the terminal determining a service code associated with the identified communication channel; and
the terminal sending an authentication response to the network, wherein the authentication response depends on the identified communication channel in that the response is calculated on the basis of the information in the authentication request and the determined service code, thereby securely including information regarding the identified communication channel through which the authentication request was received into the response.

2. Method according to claim 1, wherein the terminal comprises an identity module and a service interface (SI) module configured to securely communicate with the identity module and to identify the communications channel through which the authentication request was received.

3. Method according to claim 1, wherein the authentication request comprises authentication information the method further comprising the steps of:
the terminal modifying the authentication information on the basis of the identified communications channel; and
the terminal generating the authentication response on the basis of the modified authentication information.

4. Method according to claim 1, wherein the authentication request comprises authentication information, the method further comprising:
the terminal generating the authentication response;
the terminal modifying the authentication response on the basis of the identified communications channel.

5. Method according to claim 1, the method further comprising:
the terminal sending a service request via a predetermined communications channel to the network;
the network generating an expected service code on the basis of the type of communications channel the service request was sent to the network; and
determining on the basis of the expected service code an expected response.

6. Method according to claim 5, the method further comprising:
comparing the expected response with the authentication response sent by the terminal to the network; and
determining the terminal to be in an un-trusted state if the authentication response is not equal to the expected response.

7. Method according to claim 1, wherein the terminal comprises a 2G or 3G type radio interface, a Bluetooth radio interface, a WLAN interface, a digital enhanced cordless (DECT) radio interface or an Ethernet data interface.

8. Service interface module for use in a terminal, the service interface module comprising:
a receiver configured to receive an authentication signal from the network via one of the communications interfaces of the terminal;
a channel identifier configured to identify the communication channel through which the authentication signal was received and provide a service code associated with the identified communication channel;
a channel interface configured to establish a secure communication channel between the module and an identity module of the terminal; and
a modifier configured to modify an authentication response of the identity module on the basis of the service code associated with the identified communication channel.

9. An identity module for establishing a safe communication channel with a service interface module as claimed in claim 8, the identity module comprising: a calculator for calculating a response upon receipt of an authentication request; and a modifier for modifying the response on the basis of a predetermined mathematical function using a service code associated with the identified communication channel.

10. A terminal for accessing network services, the terminal comprising (i) an operating system having memory configured to store program instructions and (ii) a service interface module configured to identify a communication channel through which an authentication request is received, wherein the program instructions are executable by the terminal to:
receive an authentication request from the network;
determine the communication channel through which the authentication request is received;
determine a service code associated with the identified communication channel via which the authentication request was received by the terminal; and
send in response to an authentication request a modified response to the network wherein the modification depends on the determined service code.

11. A network node for service-based authentication of a terminal to a network, the network node comprising:
a receiver configured to receive an authentication data request;
a first generator configured to determine an expected service code associated with the type of communication channel via which the authentication data request was received by the network; and a second generator configured to generate in response to the receipt of an authentication data request a modified expected response, wherein the modification of the expected response depends on the determined expected service code.

12. A system for service based authentication to a network, comprising:

a terminal configured to receive an authentication request from the network, to determine a service code associated with the type of communication channel via which the authentication request was received by the terminal, and to send in response to the authentication request a modified response to the network, wherein the modification depends on the determined service code;

a network node configured to receive an authentication data request and determine an expected service code associated with the type of communication channel via which the authentication data request was received by the network and configured to generate in response to the receipt of the authentication data request a modified expected response wherein the expected response depends on the determined expected service code and configured to compare the modified response with the modified expected response.

13. A computer program product comprising software code portions configured for, when run in the memory of a terminal, executing the method according to claim 1.

* * * * *